United States Patent [19]
Kato et al.

[11] Patent Number: 6,007,615
[45] Date of Patent: Dec. 28, 1999

[54] WATER-SWELLABLE COMPOSITIONS AND SEALANTS

[75] Inventors: Keisuke Kato, Chiba-ken; Hiromichi Sugiyama, Iwaki; Yuji Kawaguchi, Matsudo; Takeshi Nakamura, Tokyo, all of Japan

[73] Assignee: Kunimine Industries Co., Ltd., Tokyo, Japan

[21] Appl. No.: 09/056,891

[22] Filed: Apr. 8, 1998

[30]        Foreign Application Priority Data

Apr. 11, 1997 [JP] Japan .................................. 9-094143

[51] Int. Cl.[6] .................................................. C09D 195/00
[52] U.S. Cl. ....................... 106/284.02; 106/283
[58] Field of Search ................ 106/284.02, 283

[56]             References Cited

U.S. PATENT DOCUMENTS

| | | | |
|---|---|---|---|
| 3,676,198 | 7/1972 | McGroaty | 106/283 |
| 4,176,102 | 11/1979 | Favata . | |
| 4,209,568 | 6/1980 | Clem . | |
| 4,279,547 | 7/1981 | Clem . | |
| 4,738,723 | 4/1988 | Frizzell et al. | 106/202 |
| 5,116,413 | 5/1992 | Nooren | 106/212 |
| 5,704,970 | 1/1998 | Kawaguchi et al. . | |

FOREIGN PATENT DOCUMENTS

| | | |
|---|---|---|
| 037717A1 | 10/1981 | European Pat. Off. . |
| 717152A1 | 6/1996 | European Pat. Off. . |
| 4020230 A1 | 1/1903 | Germany . |
| 3912765 A1 | 10/1915 | Germany . |
| 3400504 A1 | 7/1918 | Germany . |
| 1469197 | 8/1962 | Germany .............................. 106/283 |

OTHER PUBLICATIONS

Database WPI XP002071118, Japan Metals & Chemical Co. Ltd (Jun. 1983).
Database WPI XP002071010, Wang (Oct. 1995).

*Primary Examiner*—David Brunsman
*Attorney, Agent, or Firm*—Birch, Stewart, Kolasch & Birch, LLP

[57]                    ABSTRACT

There is disclosed a water-swellable composition that comprises a water-swellable clay, an asphalt, and at least one selected from the group consisting of temperature-sensitivity improving agents and reinforcing fillers. This water-preventing sealant can be produced relatively easily at a low cost, it is excellent in water-preventing performance, long-term stability, and self-sealing property, it has adhesiveness as well as shape-retainability and heat resistance, it is relatively low in compression impact resilience, it is excellent in ability to follow a substrate at the time of the application, and it is also excellent in applicability.

22 Claims, 1 Drawing Sheet

WATER-SWELLABLE COMPOSITIONS AND SEALANTS

FIELD OF THE INVENTION

The present invention relates to a water-swellable composition and a water-preventing sealant. More particularly, the present invention relates to a water-swellable water-preventing sealant for use in preventing water leakage, having excellent water-preventing performance, long-term stability, and self-sealing property to thereby ensure high work-efficiency, and to a water-swellable composition preferably used therein. In particular, the present invention relates to a water-swellable water-preventing sealant that does not allow the impermeable layer to be washed away by running water or by pre-swell upon contact with water, for example, during application, and that is high in water-preventing effect.

BACKGROUND OF THE INVENTION

Conventionally, water-preventing sealants comprising organic materials of asphalt-series, rubber-series, and resin-series, are employed for the water leakage prevention and sealing at sections where sealing is required, for example, concrete joints, a constructed joined part between a section made of concrete and a section made of another material, or a joint part of concrete secondary products, in civil engineering and building constructions, and particularly, for water leakage prevention/sealing of subsurface constructions. Further, as other water-preventing sealants, water-preventing sealants comprising inorganic materials are known, and those that harden, such as cement-series water-preventing sealants, and those of smectite-series are used. As the smectite-series water-preventing sealants, water-preventing sealants employing a bentonite material having the property of swelling by the absorption of water, are known. The water-preventing sealant comprising a bentonite-series material is used in such a manner that, for example, a bentonite in powdery or granular form is either applied as it is, alternatively, a bentonite in powdery or granular form is loaded into a container of corrugated board, nonwoven fabric, woven fabric, or the like; a bentonite in powdery or granular form is interposed between pieces of corrugated board, nonwoven fabric, woven fabric; or a bentonite is solidified with an adhesive or a resin, to form a sealing panel, sealing sheet, or a sealing rope.

In the case of these conventional water-preventing sealants, however, because lack in amount or localization (omnipresence) of the bentonite occurred, or because the conventional water-preventing sealants neither had adhesion property or plasticity, they did not well follow structures having complicated shapes, and they could neither attain improvement in applicability nor retention of the water-preventing effect for a long period of time.

The conventional organic water-preventing sealants, that is, asphalt-series, rubber-series, and resin-series water-preventing sealants, were lowered in water-preventing performance with the passage of time, for example, owing to their deterioration by the environment where they were placed or their decomposition by bacteria in soil. Therefore, in the conventional sealants, there was a problem as a material in view of retention of the level of original water-preventing effect for a long period of time. Further, even in the case of inorganic water-preventing sealants, such as cement-series water-preventing sealants, which require curing after the application, a certain period of time are required until they are dried completely after the application, so that the influence of weather at the time of the application or after the application has to be taken into account. It put various restrictions on the execution of work. Further, none of asphalt-series, rubber-series, resin-series, and cement-series water-preventing sealants had a self-sealing property.

On the other hand, smectite-series water-preventing sealants comprising a powder or granular bentonite do not need curing, they are excellent in water-preventing performance and long-term stability, and they have a self-sealing property by absorbing water to swell and close spaces around the water-preventing sealant.

However, they had a problem that they were poor in working applicability. When the substrate surface where sealing was required was rough or had a complicated shape, such as a step, since conventional bentonite water-preventing sealants could not be brought in close contact with the substrate surface, the substrate surface was required to be made smooth prior to application of the sealants. Further, conventional bentonite water-preventing sealants did not well follow the substrate when applied, and there were spaces remained between bentonite particles in the conventional bentonite water-preventing sealants. Therefore, there existed a clearance (space) between the water-preventing sealant and the substrate, and there also existed clearances (spaces) between bentonite particles, until the bentonite absorbs water, to swell, and thus there was a problem that any water-preventing effect was not available until the water-preventing sealant swells, to close the spaces.

Accordingly in order to solve these problems of the long-term stability, the working applicability, and the water-preventing effect, water-preventing sealants formed in a bole state by kneading a bentonite and a gelled base oil are proposed (U.S. Pat. No. 4,209,568, U.S. Pat. No. 4,279,547, and U.S. Pat. No. 5,704,970). Since these bentonite water-preventing sealants in a bole state have plasticity and therefore can be brought in close contact with the substrate where sealing is required. The sealants in a bole state permit any space between the water-preventing sealant and the substrate, and any spaces between the bentonite particles in the water-preventing sealant, to exist minimally at the time of the application. Therefore, in the sealant in a bole state, a water-preventing effect can be expected immediately after the application, and an excellent water-preventing effect having self-sealing property owing to the swellability of bentonite, can be obtained.

These bentonite-series water-preventing sealants in a bole state have, however, the faults that the production is troublesome and that the cost is high, since a specified gelled base oil is used. Further, although their water-preventing effect is high, these sealants are still unsatisfactory on the following views. That is, the sealants in a bole state absorb water, to swell, for example, during the application, thereby making the application difficult in some cases; and, when the water-preventing sealant comes in contact with running water after they are applied, the impermeable layer of the swollen water-preventing sealant is washed away little by little, thereby lowering the water-preventing effect, in some cases.

U.S. Pat. No. 5,116,413 discloses sealing agents prepared by mixing well a water-swellable polymer, such as bentonite, with a viscous hydrophobic substance whose viscosity is lost upon heating, selected from among a tar-like product, bitumen, and vaseline, and a small amount of a hydrophilic substance, selected from polyhydric alcohols or water. These sealing agents adhere to a wide variety of materials, have ability to swell in water, and have plasticity. However, these sealing agents are each a soft mixture to be used by filling it in a casing or a container; for example, by packing it in a bag. Therefore, if this sealing agent is used as it is without placing it in a container or a casing, shape-retainability is poor, and further, this sealing agent becomes fluidized when heated, particularly at a high temperature.

SUMMARY OF THE INVENTION

An object of the present invention is to provide a water-preventing sealant, which can be produced relatively easily at a low cost, which is excellent in water-preventing performance, long-term stability, and self-sealing property, which has adhesiveness as well as shape-retainability and heat resistance, which is relatively low in compression impact resilience, which is excellent in ability to follow a substrate at the time of the application, and which is also excellent in applicability.

Another object of the present invention is to provide a composition for use in the above water-preventing sealant.

Still another object of the present invention is to provide a water-preventing sealant, which do not allow the impermeable layer of the water-preventing sealant to be washed away, even when exposed to running water during or after the application or even when the sealant absorbs water to swell during the application.

Further another object of the present invention is to provide a composition for use in the above water-preventing sealant.

Other and further objects, features, and advantages of the invention will appear more fully from the following description, taken in connection with the accompanied drawings.

DETAILED DESCRIPTION OF THE INVENTION

Figure 1:
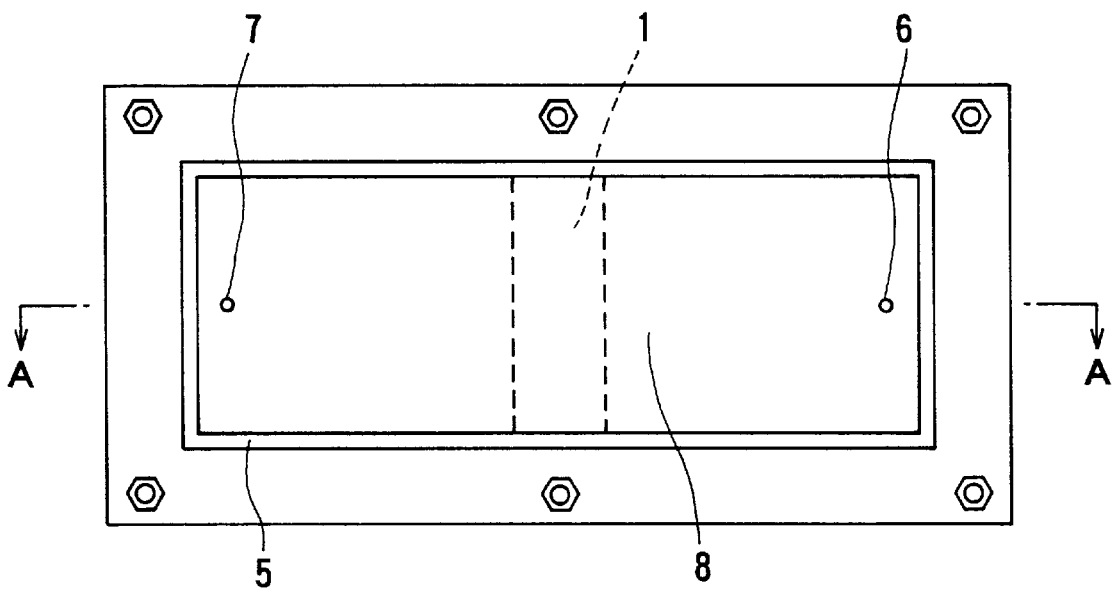
FIG. 1 is a plane view of a water-preventing test apparatus.

In view of the above problems, the present inventors have investigated in various ways and have found that a composition produced by mixing a water-swellable clay, an asphalt, and a prescribed temperature-sensitivity improving agent and/or reinforcing filler, has, as a water-preventing sealant, excellent water-preventing performance, long-term stability, and self-sealing property. Further, the said water-preventing sealant can serve as a plastic material which can be molded reversibly into a desired shape (into the shape of a sheet, a rope, a pipe, or the like), which can easily maintain its shape, and is excellent in applicability. In addition, the water-preventing sealant neither allows the impermeable layer of the water-preventing sealant to be washed away by running water during or after the application or by absorption of water to swell during the application. The present invention has be completed based on these findings.

That is, the present invention provides:

(1) A water-swellable composition, comprising a water-swellable clay, an asphalt, and at least one selected from the group consisting of temperature-sensitivity improving agents and reinforcing fillers;

(2) The water-swellable composition as stated in the above (1), which comprises (a) 5 to 90% by weight of the water-swellable clay, (b) 5 to 90% by weight of the asphalt, and (c) 0.1 to 50% by weight of the at least one selected from the group consisting of temperature-sensitivity improving agents and reinforcing fillers;

(3) The water-swellable composition as stated in the above (1), which comprises (a) 30 to 70% by weight of the water-swellable clay, (b) 20 to 65% by weight of the asphalt, and (c) 0.5 to 40% by weight of the at least one selected from the group consisting of temperature-sensitivity improving agents and reinforcing fillers;

(4) The water-swellable composition as stated in the above (1), (2), or (3), wherein the said water-swellable clay is a smectite-series clay or a swellable mica;

(5) The water-swellable composition as stated in the above (1), (2), or (3), wherein the said water-swellable clay is a bentonite;

(6) The water-swellable composition as stated in the above (1), (2), (3), (4), or (5), wherein the said temperature-sensitivity improving agent is a rubber and the said reinforcing filler is a zeolite;

(7) A water-swellable water-preventing sealant, comprising a water-swellable clay, an asphalt, and at least one selected from the group consisting of temperature-sensitivity improving agents and reinforcing fillers;

(8) The water-swellable water-preventing sealant as stated in the above (7), which comprises (a) 5 to 90% by weight of the water-swellable clay, (b) 5 to 90% by weight of the asphalt, and (c) 0.1 to 50% by weight of the at least one selected from the group consisting of temperature-sensitivity improving agents and reinforcing fillers;

(9) The water-swellable water-preventing sealant as stated in the above (7), which comprises (a) 30 to 70% by weight of the water-swellable clay, (b) 20 to 65% by weight of the asphalt, and (c) 0.5 to 40% by weight of the at least one selected from the group consisting of temperature-sensitivity improving agents and reinforcing fillers;

(10) The water-swellable water-preventing sealant as stated in the above (7), (8), or (9), wherein the said water-swellable clay is a smectite-series clay or a swellable mica;

(11) The water-swellable water-preventing sealant as stated in the above (7), (8), or (9), wherein the said water-swellable clay is a bentonite; and

(12) The water-swellable water-preventing sealant as stated in the above (7), (8), (9), (10), or (11), wherein the said temperature-sensitivity improving agent is a rubber and the reinforcing filler is a zeolite.

Now, the present invention is described in detail.

In the water-preventing sealant of the present invention, use is made of at least one clay selected from natural or synthetic water-swellable clays. Such a clay may be an undenatured or denatured clay, but preferably it is at least one selected from smectite-series clays, such as bentonites and hectorites, and swellable micas. Among these, a bentonite is a particularly preferable clay, because it is a natural inorganic clay, so as to be excellent in safety and stable for a long period of time without being decomposed by microorganisms in soil, it is able to retain a high water-preventing effect, and it is low in cost. In the water-preventing sealant of the present invention, one clay selected from among the above clays may be used singly, or two or more of the clays may be used in combination. In the water-preventing sealant of the present invention, the above water-swellable clay is used preferably in an amount of 5 to 90% by weight, more preferably 10 to 80% by weight, and further preferably 30 to 70% by weight.

The composition and water-preventing sealant of the present invention each comprises a mixture of the above clay, the above asphalt, and the at least one selected from the group consisting of temperature-sensitivity improving agents and reinforcing fillers, in prescribed amounts, respectively.

As the asphalt used in the present invention, any of natural asphalts, such as asphaltite and rock asphalt, and petroleum asphalts, such as straight asphalt and blown asphalt, can be used. Further, modified asphalts, such as asphalt compounds and rubberized asphalts can also be used. In the present invention, two or more of these asphalts may be used in combination. Further, the modified asphalts may be commercially available ones, and those obtained by modifying natural asphalts or petroleum asphalts with the temperature-sensitivity improving agent or the reinforcing filler can also be used. The asphalts that will be modified are not particularly limited, but the amount of the temperature-sensitivity improving agent or the reinforcing filler to be added should be adjusted to obtain desired physical properties when the modification is carried out.

The asphalt is required to prevent the swollen impermeable layer of the water-preventing sealant of the present invention from being washed away by running water, at the time when the water-preventing sealant swollen by the absorption of water. Further, by changing the amount of the asphalt to be added, the swelling speed and the swelling rate (swelling factor) of the water-preventing sealant of the present invention at the time when it is swollen by absorption of water, can be adjusted arbitrarily.

In the water-preventing sealant of the present invention, the above asphalt is contained in an amount of generally 5 to 90% by weight, preferably 10 to 80% by weight, and more preferably 20 to 65% by weight. If the amount of the asphalt is too small, the effect of furnishing the water-preventing sealant of the present invention with a desired plasticity and adhesiveness and the effect of adjusting the swelling of the water-preventing sealant of the present invention are unsatisfactory. On the other hand, if the amount of the asphalt is too large, the properties of the composition are governed by the asphalt, and therefore, the shape-retainability becomes worsened and the composition cannot be swollen, thereby the sealant becomes not to exhibit the self-sealing property.

In the present invention, an asphalt is modified with temperature-sensitivity improving agents and/or reinforcing fillers. Herein, the term "temperature-sensitivity" means a property that the hardness or viscosity of the substance is changed according to the change of temperature. Therefore, the term "temperature-sensitivity improving agent" means an additive to make the composition of the present invention or the water-preventing sealant prepared therefrom, hardly change its hardness etc. along with the change of temperature. On the other hand, the term "reinforcement" in the reinforcing filler means to improve physical property of substances, such as shape-retainability. Therefore, the term "reinforcing filler" means an additive that is added to improve the shape-retainability of the composition of the present invention generally at normal temperature, and further, to present fluidization and deformation of the composition during stacking, transferring, and application.

Examples of the temperature-sensitivity improving agent for use in the present invention includes rubbers (e.g. natural rubber, styrene-butadiene rubber, ethylene-propylene rubber, isoprene rubber, chloroprene rubber, isobutylene-isoprene rubber, and isobutyrene rubber), thermoplastic resins compatible with asphalts or softeners (oils) (e.g. polybutene resins, acrylic resins, celluloic resins, rosin resins, terpene resins, xylene resins, phenolic resins, and aliphatic, aromatic or cycloaliphatic petroleum resins), oil-absorbable polymers (e.g. polynorbornene crosslinked products, crosslinked products of copolymers of alkylstyrenes, alkyl (meth)acrylates, etc., and long-chain alkyl acryalte polymers), and fatty acids and their salts (higher-fatty acids having preferably 8 to 40 carbon atoms, or salts thereof, such as alkali metal salts, alkali earth metal salts, ammonium salts, or amine salts). The examples of the reinforcing filler includes inorganic fillers (e.g. zeolites, activated china clays, organic clay minerals, fly ash, silica, and diatomaceous earth), fibrous materials (e.g. paper powders, wood powders, pulp, cotton, and synthetic fibers), and activated carbon. These may be used singly or in combination of two or more. By the addition of the temperature-sensitivity improving agent and/or the reinforcing filler, it is possible to improve the temperature-sensitivity (heat resistance and cold resistance), the shape-retainability as well as the plasticity, the resiliency, the impact resistance, the durability, the chemical resistance, and the like, of the composition and the water-preventing sealant of the present invention, and the composition and the water-preventing sealant of the present invention are given with these desired properties. As the temperature-sensitivity improving agent and the reinforcing filler, thermoplastic resins, rubbers, and inorganic fillers are preferable, with more preference given to polybutene resins, styrene-butadiene rubbers, and zeolites.

In the present invention, the above temperature-sensitivity improving agent and reinforcing filler are classified according to their main function, for convenience, and it can be said that both of these two have a function to modify the temperature-sensitivity and fluidity of an asphalt.

Functions common to these temperature-sensitivity improving agent and reinforcing filler are to restrict and prevent the fluidization of an asphalt, and to make the asphalt hardly influenced by the change of temperature, and it can be said that these functions are attained based on the oil-absorbability and gelation property. In concrete, rubbers, thermoplastic resins, and aliphatic acids and their salts have a function to set asphalts and softener (oil) to be a gel to prevent from fluidization. On the other hand, oil-absorbing polymers, inorganic fillers, fibrous substances, and active carbons have a function to absorb the asphalt and oil to prevent from fluidization. The term "oil-absorbing" means a substance having such property that, when it is mixed with an oil, it keep the oil in it to prevent the migration of oil to the outside of the mixture. The substrate that can keep at least 20% by weight or more of oil to the weight of the substance itself and can have oil-absorbing property, is preferable. Such oil-absorbing substance (oil-absorbing agent) is effective to prevent the leakage or sag of the composition or water-preventing sealant of the present invention, and it is also effective to prevent oozing, separation, or migration, of asphalts or softener (oil).

The amount of the temperature-sensitivity improving agent and/or the reinforcing filler for use in the present invention to be added, is generally 0.1 to 50% by weight, preferably 0.5 to 40% by weight, and more preferably 4 to 35% by weight, in the water-preventing sealant of the present invention. If the amount of the temperature-sensitivity improving agent and reinforcing filler is too small, the composition and the water-preventing sealant of the present invention cannot be given with desired temperature-sensitivity, plasticity, adhesion, and shape-retainability, so as to be lowered in applicability, while if the amount is too large, the swelling capacity of the water-preventing sealant is lowered and the self-sealing property cannot be exhibited.

Further, the composition and the water-preventing sealant of the present invention can contain, in addition to the above essential components, if necessary, various additives as optional components, which are used in conventional water-preventing sealants, in the range that does not impair the objects of the present invention. Examples of such additives include softeners (e.g. oils, such as mineral oils, synthetic oils, and aliphatic oils), stabilizers (e.g. anionic surfactants and nonionic surfactants), anti-foaming agents, antifreezing agents, antioxidants, and coloring agents. In the present invention, it is preferable to use a softener, while the use of the softener is not necessary when an asphalt containing an oil is used. In the case wherein a softener is added, the amount is preferably 0.1 to 50% by weight and more preferably 1 to 20% by weight, in the water-preventing sealant.

In producing the composition and the water-preventing sealant of the present invention, the order and the method in which the components are added and mixed are not particularly limited.

The composition and the water-preventing sealant of the present invention are obtained as a uniform mixture by mixing well the water-swellable clay, the asphalt, and the temperature-sensitivity improving agent and/or the reinforcing filler. At that time, heating can make the mixing easy. The stirring and mixing is performed well, while heating the mixture generally at 50 to 250° C. and preferably 100 to 200° C., until the mixture become uniform. At that time, if the heating is performed at a high temperature for a long period of time, the quality will be lowered, therefore it is required to pay attention. This mixture has so-called clayey plasticity, adhesiveness, and spreadability. This mixture can be used with molding it easily into a desired shape when applied, it can follow complicated shapes of the substrate surface where sealing is required, such as a concrete joint part, to make it in close contact with the substrate, and it is also easy to retain the shape of the mixture. Therefore, the mixture is a water-preventing sealant quite excellent in workability. One feature of the present invention is the use of the water-swellable clay and the asphalt in combination with the temperature-sensitivity improving agent and/or the reinforcing filler. This brings about the double water-preventing effects to the composition and the water-preventing sealant of the present invention. Those are, the water-tightness resulting from the close adhesion to the substrate immediately after the application, and the self-sealing property resulting from the swelling by the absorption of water. Further, in the water-preventing sealant of the present invention, because of use of the temperature-sensitivity improving agent and the reinforcing filler, flow of the asphalt can be suppressed as well as ooze and migration of the asphalt and the oil components can be prevented. Therefore, after the water-preventing sealant of the present invention swells by the absorption of water, the impermeable layer of the swollen water-preventing sealant is not washed away to the outside by, for example, running water, and there is an effect to prevent deterioration of the water-preventing performance for a long period of time. As a result of these effects, the water-preventing sealant of the present invention can exhibit the stable water-preventing effect for a long period of time, even under conditions wherein the water-preventing sealant is expected to come in contact with water, for example, during the application, or under severe conditions wherein there is a wide gap, for example, between masonry joints and joints, or the amount of running water is large and the pressure of the running water is high.

When the water-preventing sealant of the present invention is used at a position where repair is required or sealing is required in a structure, such as a concrete joint part, a joined part of a section made of concrete with a section made of another material, or a joint part of a concrete secondary product, the water-preventing sealant prevents water penetration, and at the same time, absorbs water to swell. Further, the asphalt and the temperature-sensitivity improving agent and/or the reinforcing filler being present in the water-preventing sealant prevents the water-preventing sealant, during the application, from swelling with rain water or subterranean water to lose the self-sealing property, as well as they do not allow the impermeable layer of the swollen water-preventing sealant to flow out to the outside.

Therefore, the water-preventing sealant of the present invention, that is placed continuously at a position where sealing is required, such as a concrete joint part, a joined part, a masonry (fitting) part, or a part where repairing is required, forms an impermeable layer and swells by the absorption of water, so that the water-preventing sealant can stop (shut) penetration of water completely for a long period of time.

Further, even in the case wherein the substrate where sealing is required is rough, or has a complicated shape, such as a step, the water-preventing sealant of the present invention does not require that the substrate is made smooth. In addition, in the case wherein there is a laitance layer or there are minute cracks, the swelling effect and the clogging effect of the water-preventing sealant of the present invention make it possible to stop water completely.

Since the water-preventing sealant of the present invention can be molded into any shape and has an appropriate hardness and adhesiveness, the water-preventing sealant of the present invention can be applied to a part having any shape, where sealing is required. Therefore, the water-preventing sealant of the present invention is excellent in workability and applicability when used in field. Further since the extent of the swelling can be controlled, a suitable method of using the sealant of the invention can be chosen depending on the site and conditions of the application. In this case, since the water-preventing sealant of the present invention can be deformed into any shape by pressing by hand, and since it has good shape-retainability, the use of a casing, a container, and the like is not needed. Further, comes off of the water-preventing sealant of the present invention after application would not occur, even when the water-preventing sealant of the present invention comes in contact with subterranean water or rain water and absorbs the water to swell, for example, during the application. In addition, the impermeable layer of the swollen water-preventing sealant is not washed away by running water. Therefore, the water-preventing effect is not affected by the conditions of the site where sealing is required or by the environment of the application. Further, since the water-preventing effect is attributed to the water-swellable clay, the durability is excellent and it is expected that the water-preventing properties last semipermanently. In addition, the water-preventing sealant of the present invention has such a self-sealing effect, that if the site where sealing has been done with the sealant is formed with a gap, such as a crack, the gap is filled with the sealant swollen with absorbed water, thereby preventing any leakage of water completely. After the application, even if the site where sealing has been done with the water-preventing sealant is formed with a crack in lapse of time, upon absorbing water the water-preventing sealant of the present invention swells reversibly to close the crack, and therefore the water-preventing action can be positively exhibited.

Now, the present invention is described in more detail with reference to the following Examples, but the present invention is not limited to these Examples.

EXAMPLES

Contents of various materials used in the Examples and Comparative Examples are shown in the following Table.

| Materials | Trade name or substance name |
| --- | --- |
| Bentonite | Kuni Gel VI (trade name) manufactured by Kunimine Industries Co., Ltd. |
| Asphalt (a) | straight asphalt (penetration: 80–100) |
| Asphalt (b) | straight asphalt (penetration: 60–80) |
| Asphalt (c) | blown asphalt (penetration: 30–40) |
| Rubberized asphalt | rubberized asphalt (containing 7% of SBR) |
| Zeolite | Zeolite#150 (trade name) manufactured by Kunimine Industries Co., Ltd. |
| Diatomaceous earth | diatomaceous earth manufactured by Hokushu Keisodo Co. |
| Activated carbon | activated carbon manufactured by Takeda Chemical Industries, Ltd. |
| Styrene-butadiene rubber | styrene-butadiene rubber manufactured by Japan Synthetic Rubber Co., Ltd. |
| Paper powder | paper powder |
| Isobutylene-isoprene rubber | isobutylene-isoprene rubber manufactured by Japan Synthetic Rubber Co., Ltd. |
| Polybutene resin | Polybutene 2000H (trade name) manufactured by Idemitsu Petrochemical Co. |
| Fatty acid amide | Amide HT (trade name) manufactured by Lion Co. |
| Oil-absorbable polymer | A610 Petro Bond (trade name) manufactured by Nochar Co. |
| Machine oil | Cosmo machine 46 (trade name) manufactured by Cosmo Petroleum Co. |
| Silicone oil | Silicone Oil SH200 (trade name) manufactured by Toray-Dow Corning Co. |
| Process oil | Cosmoprocess 100 (trade name) manufactured by Cosmo Petroleum Co. |

Example 1

| Component | Parts by weight |
| --- | --- |
| Bentonite | 40 |
| Asphalt (a) | 30 |
| Zeolite | 20 |
| Machine oil | 10 |

The above components were put together and were mixed well for 30 min while heating to 170° C., thereby obtaining a composition, which was named Sample 1. Sample 1 had adhesiveness and followed irregularities of a concrete surface well.

Example 2

| Component | Parts by weight |
| --- | --- |
| Bentonite | 45 |
| Asphalt (c) | 34 |
| Zeolite | 15 |
| Machine oil | 6 |

The above components were put together and were mixed well for 30 min while heating to 200° C., thereby obtaining a composition, which was named Sample 2. Sample 2 had adhesiveness and followed irregularities of a concrete surface well.

Example 3

| Component | Parts by weight |
| --- | --- |
| Bentonite | 30 |
| Asphalt (a) | 30 |
| Diatomaceous earth | 30 |
| Machine oil | 10 |

The above components were put together and were mixed well for 30 min while heating to 170° C., thereby obtaining a composition, which was named Sample 3. Sample 3 had adhesiveness and followed irregularities of a concrete surface well.

Example 4

| Component | Parts by weight |
| --- | --- |
| Bentonite | 45 |
| Asphalt (a) | 30 |
| Paper powder | 15 |
| Machine oil | 10 |

The above components were put together and were mixed well for 30 min, thereby obtaining a composition, which was named Sample 4. Sample 4 had adhesiveness and followed irregularities of a concrete surface well.

Example 5

| Component | Parts by weight |
| --- | --- |
| Bentonite | 30 |
| Asphalt (a) | 29 |
| Zeolite | 35 |
| Silicone oil | 6 |

The above components were put together and were mixed well for 30 min while heating to 170° C., thereby obtaining a composition, which was named Sample 5. Sample 5 had adhesiveness and followed irregularities of a concrete surface well.

Example 6

| Component | Parts by weight |
| --- | --- |
| Bentonite | 66 |
| Asphalt (a) | 20 |
| Activated carbon | 5.2 |
| Machine oil | 8.8 |

The above components were put together and were mixed well for 30 min while heating to 170° C., thereby obtaining a composition, which was named Sample 6. Sample 6 had adhesiveness and followed irregularities of a concrete surface well.

Example 7

| Component | Parts by weight |
| --- | --- |
| Bentonite | 55 |
| Asphalt (a) | 24 |
| Styrene-butadiene rubber | 1 |
| Process oil | 20 |

Among the above components, at the first, the asphalt and the styrene-butadiene rubber were put together and were mixed while heating to 190° C., thereby obtaining Modified Asphalt 1. Then the bentonite and the process oil were added to the Modified Asphalt 1, and they were mixed well for 30 min while heating to 190° C., thereby obtaining a composition, which was named Sample 7. Sample 7 had adhesiveness and followed irregularities of a concrete surface well.

Example 8

| Component | Parts by weight |
| --- | --- |
| Bentonite | 50 |
| Asphalt (a) | 10 |
| Rubberized asphalt | 17 |
| Zeolite | 5 |
| Process oil | 18 |

The above components were put together and were mixed well for 30 min while heating to 190° C., thereby obtaining a composition, which was named Sample 8. Sample 8 had adhesiveness and followed irregularities of a concrete surface well.

Example 9

| Component | Parts by weight |
| --- | --- |
| Bentonite | 50 |
| Asphalt (a) | 24 |
| Zeolite | 5 |
| Styrene-butadiene rubber | 1 |
| Machine oil | 20 |

Among the above components, the asphalt, the zeolite, and the styrene-butadiene rubber were put together and were mixed while heating to 190° C., thereby obtaining Modified Asphalt 2. Then the bentonite and the machine oil were added to the Modified Asphalt 2, and they were mixed well for 30 min while heating to 190° C., thereby obtaining a composition, which was named Sample 9. Sample 9 had adhesiveness and followed irregularities of a concrete surface well.

Example 10

| Component | Parts by weight |
| --- | --- |
| Bentonite | 55 |
| Asphalt (a) | 30 |
| Isobutylene-isoprene rubber | 5 |
| Machine oil | 10 |

The above components were put together and were mixed well for 30 min while heating to 190° C., thereby obtaining a composition, which was named Sample 10. Sample 10 had adhesiveness and followed irregularities of a concrete surface well.

Example 11

| Component | Parts by weight |
| --- | --- |
| Bentonite | 60 |
| Asphalt (a) | 20 |
| Polybutene resin | 10 |
| Machine oil | 10 |

The above components were put together and were mixed well for 30 min while heating to 200° C., thereby obtaining a composition, which was named Sample 11. Sample 11 had adhesiveness and followed irregularities of a concrete surface well.

Example 12

| Component | Parts by weight |
| --- | --- |
| Bentonite | 65 |
| Asphalt (a) | 20 |
| Fatty acid amide | 5 |
| Machine oil | 10 |

The above components were put together and were mixed well for 30 min while heating to 150° C., thereby obtaining a composition, which was named Sample 12. Sample 12 had adhesiveness and followed irregularities of a concrete surface well.

Example 13

| Component | Parts by weight |
| --- | --- |
| Bentonite | 35 |
| Asphalt (c) | 54 |
| Oil-absorbable polymer | 1 |
| Machine oil | 10 |

The above components were put together and were mixed well for 30 min while heating to 120° C., thereby obtaining a composition, which was named Sample 13. Sample 13 had adhesiveness and followed irregularities of a concrete surface well.

Comparative Example 1

| Component | Parts by weight |
| --- | --- |
| Bentonite | 50 |
| Asphalt (c) | 40 |
| Machine oil | 10 |

The above components were put together and were mixed well for 30 min while heating to 170° C., thereby obtaining a composition, which was named Sample 14. Sample 14 had adhesiveness and followed irregularities of a concrete surface well, but the shape-retainability was bad, and the shape could not be kept.

Comparative Example 2

| Component | Parts by weight |
|---|---|
| Bentonite | 45 |
| Asphalt (a) | 49.5 |
| Machine oil | 5.5 |

The above components were put together and were mixed well for 30 min while heating to 190°C., thereby obtaining a composition, which was named Sample 15. Sample 15 had adhesiveness and followed irregularities of a concrete surface well, but the shape-retainability was bad and the shape could not be kept.

Comparative Example 3

| Component | Parts by weight |
|---|---|
| Asphalt (a) | 66 |
| Zeolite | 7 |
| Styrene-butadiene rubber | 1 |
| Machine oil | 26 |

The above components were put together and were mixed well for 30 min while heating to 190° C., thereby obtaining a composition, which was named Sample 16. Sample 16 had adhesiveness and followed irregularities of a concrete surface well, but did not have self-sealing property.

Comparative Example 4

25 parts by weight of paraffin wax was added to 75 parts by weight of the machine oil, and they were vigorously stirred while heating to 90° C., thereby obtaining Base Oil 1 in the state of a gel. Then, 33 parts by weight of the Base Oil 1 and 67 parts by weight of bentonite were mixed to obtain a composition, which was named Sample 17. Sample 17 had adhesiveness and followed irregularities of a concrete surface well, but it was washed away after swelling.

Comparative Example 5

50 parts by weight of calcium stearate was added to 100 parts by weight of the machine oil, and they were vigorously stirred to obtain Base Oil 2 in the state of a gel. 30 parts by weight of the Base Oil 2 and 70 parts by weight of bentonite were mixed, thereby obtaining a composition, which was named Sample 18. Sample 18 had adhesiveness and followed irregularities of a concrete surface well, but it was washed away after swelling.

With respect to Samples 1 to 18 obtained, the swellability, the rate of penetration, the shape-retainability, and the heat resistance were measured by the following methods. Samples 1 to 18 (Examples 1 to 13 and Comparative Examples 1 to 5) were low in compression impact resilience, and when pressed by the finger they remained in the deformed form and did not be restored in the original form.

The results are shown in Table 1.

Swellability

A sample of the above Samples was loaded into a cylindrical acrylic resin cell (having an inner diameter of 26 mm and a height of 50 mm) to the level of 10 mm from the bottom. The upper part of the cell was filled with water, a lid was placed so that the water might not evaporate, the cell was allowed to stand in a thermostatic chamber at 25° C., and the height of the sample was read every certain period. The original set value was assumed 100%, and the percentage of the swellability in each case is shown. (If the height of the sample becomes 20 mm, the swellability is 200%.)

Rate of Penetration

The rate of penetration was measured in accordance with JIS K-2530 Petroleum Asphalt Penetration Test Method.

Shape Retainability and Heat Resistance

A sample of the above Samples was molded into a column shape having a diameter of 18 mm and a height of 20 mm, the column was placed on an aluminum plate, and was allowed to stand for 5 days in a thermostatic chamber at 25° C., and the spread of the column was measured. When the shape remained the same, the sample was designated "⊚", when the column was spread to a diameter of less than 25 mm, the sample was designated "○", and when the column was spread to a diameter of 25 mm or more, it was judged that the sample had fluidability and could not retain the shape, and the sample was designated "×".

The samples that were confirmed "⊚" and "○" at 25° C. were tested in the same manner as above, except that the temperature in the thermostatic chamber was changed to 50° C., and when the shape remained the same, the sample was designated "⊚", when the column was spread to a diameter of less than 25 mm, the sample was designated "○", and when the column was spread to a diameter of 25 mm or more, it was judged that the sample was not heat resistant and the sample was designated "×".

TABLE 1

| Sample No. | Swellability (%) after 1 day | Swellability (%) after 5 days | Swellability (%) after 3 weeks | Penetration | Shape retainability | Heat resistance | Remarks |
|---|---|---|---|---|---|---|---|
| 1 | 140 | 150 | 150 | 138 | ○ | ○ | This invention |
| 2 | 140 | 160 | 180 | 136 | ○ | ○ | This invention |
| 3 | 100 | 105 | 110 | 124 | ○ | ○ | This invention |
| 4 | 130 | 150 | 180 | 202 | ○ | ○ | This invention |
| 5 | 100 | 100 | 120 | 54 | ⊚ | ○ | This invention |
| 6 | 170 | 280 | 300 | 128 | ○ | ○ | This invention |
| 7 | 150 | 220 | 260 | 130 | ⊚ | ○ | This invention |
| 8 | 140 | 180 | 220 | 120 | ⊚ | ⊚ | This invention |
| 9 | 140 | 180 | 220 | 122 | ⊚ | ⊚ | This invention |
| 10 | 140 | 170 | 200 | 74 | ⊚ | ⊚ | This invention |
| 11 | 180 | 230 | 270 | 64 | ⊚ | ⊚ | This invention |
| 12 | 200 | 250 | 300 | 115 | ⊚ | ⊚ | This invention |
| 13 | 100 | 100 | 110 | 95 | ○ | ○ | This invention |
| 14 | 130 | 140 | 180 | 60 | X | — | Comparative example |
| 15 | 120 | 130 | 160 | 66 | X | — | Comparative example |
| 16 | 100 | 100 | 100 | 87 | ○ | ○ | Comparative example |
| 17 | 190 | 240 | 280 | — | ⊚ | X | Comparative example |
| 18 | 200 | 240 | 290 | — | ⊚ | X | Comparative example |

As is apparent from the results shown in Table 1, in the water-preventing sealant of the present invention, the swelling could be controlled by the formulation, and moreover, it exhibited good shape-retainability, and fluidization of the sealant was not observed.

That is, the water-preventing sealant of the present invention had such good properties that, even though the sample had a large penetration, that is, the sample was soft, the sealant kept the molded shape, the sealant was easily handled, and the applicability was good. On the other hand, among the cases of the Comparative Examples, even Samples 14 and 15 that were relatively hard, could not keep the shape in lapse of time, which not only made the applicability bad, but also affected adversely the water-preventing performance, that is, they had a problem to use as a water-preventing sealant. Depending on the conditions, it was observed the water-preventing sealants of the Comparative Examples were not fluidized in some cases, but they were only for the cases wherein the swelling extent was quite small or no asphalt was used.

Figure 2:
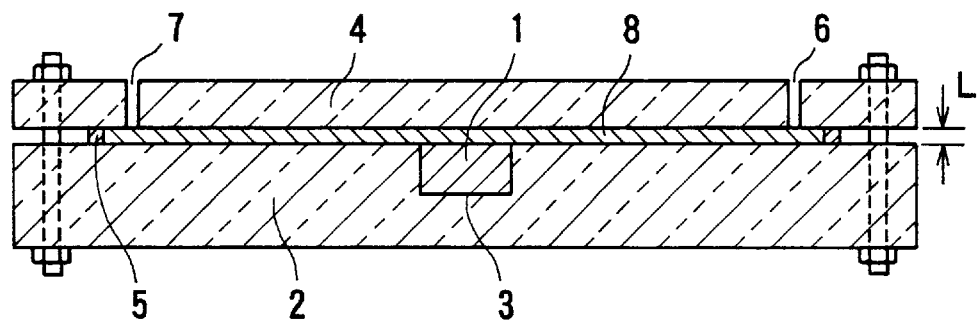
FIG. 2 is a sectional view of the water-preventing test apparatus taken along line A—A of FIG. 1.

Further, with respect to the obtained Samples 1 to 18, using a water-preventing test apparatus made of a transparent acrylic resin (whose plane view is shown in FIG. 1, and whose sectional view taken along line A—A of FIG. 1 is shown in FIG. 2), the water-preventing performance and the washaway resistance were tested by the following method:

Test Method

A sample 1 was placed in a sample filling groove 3 (having a length of 20 mm, a width of 60 mm, and a depth of 10 mm) formed in a lower acrylic plate 2 (having a length of 280 mm, a width of 120 mm, and a thickness of 20 mm). At that time, the level of the sample was made just to fill the depth of the sample filling groove so that the level of the sample might be coplanar with the surface of the lower acrylic plate 2 without forming any step. An upper acrylic plate 4 (having the same dimensions as those of the lower acrylic plate 2, except that the thickness was 10 mm and no groove was made) was placed on the lower acrylic plate 2 to sandwich a silicone packing 5, between the lower acrylic plate 2 and the upper acrylic plate 4, so that a clearance L measuring 2 mm might be secured as a water passage 8 (having a length of 250 mm and a width of 60 mm). Water was passed from a water supply port 6 formed in the upper acrylic plate at a constant flow rate (500 cc/min) and the assembly was allowed to stand. In the figure, 7 indicates a drainage hole. The swollen state and the washaway state were visually confirmed and the time required for the stop of the flow of water, and the pressure of water at the time when the flow of water was stopped, were recorded.

The results are shown in Table 2.

TABLE 2

| Sample No. | Water pressure when sealed (kg/cm$^2$) | State of swelling | State of washing away | Time required to seal (hr) | Remarks |
|---|---|---|---|---|---|
| 1 | 1.0 | slow swelling | no washing away | 20 | This invention |
| 2 | 1.0 | slow swelling | no washing away | 24 | This invention |
| 3 | 1.0 | slow swelling | no washing away | 275 | This invention |
| 4 | 1.0 | slow swelling | no washing away | 26 | This invention |
| 5 | 1.0 | slow swelling | no washing away | 36 | This invention |
| 6 | 1.0 | fast swelling | no washing away | 4 | This invention |
| 7 | 1.0 | fast swelling | no washing away | 7 | This invention |
| 8 | 1.0 | fast swelling | no washing away | 12 | This invention |
| 9 | 1.0 | fast swelling | no washing away | 10 | This invention |
| 10 | 1.0 | fast swelling | no washing away | 8 | This invention |
| 11 | 1.0 | fast swelling | no washing away | 5 | This invention |
| 12 | 1.0 | fast swelling | no washing away | 3 | This invention |
| 13 | 1.0 | slow swelling | no washing away | 312 | This invention |
| 14 | 1.0 | slow swelling | no washing away | 24 | Comparative example |
| 15 | 1.0 | slow swelling | no washing away | 30 | Comparative example |
| 16 | — | no swelling | no washing away | cannot be sealed | Comparative example |
| 17 | — | fast swelling | swollen portion was washed away | cannot be sealed | Comparative example |
| 18 | — | fast swelling | swollen portion was washed away | cannot be sealed | Comparative example |

As is apparent from the results shown in Table 2, the water-preventing sealant of the present invention was excellent as a water-preventing sealant, because it had so-called self-sealing property, filling and sealing a gap by swelling, and it could prevent the swollen impermeable layer from being washed away by running water. Namely, the samples of the present invention did not suffer from such a defect that, when the water-preventing sealant of the present invention came in contact with subterranean water or rain water, for example, during the application, to absorb water to swell, and then, after the completion of the application, the water-preventing sealant came off. In addition, the samples of the present invention did not suffer from such another defect that the impermeable layer of the swollen water-preventing sealant was washed away by running water. Thus the samples of the present invention were excellent in that a stable water-preventing effect was secured for a long period of time. On the other hand, in the cases of those of the Comparative Examples, the swollen impermeable layer was washed away by running water and the water-preventing effect was lowered, which is a problem for them to be used as a water-preventing sealant. However, depending on the conditions, there were some cases wherein the impermeable layer was not washed away, but they were only for the cases wherein the shape-retainability was bad or they were not swollen.

Having described our invention as related to the present embodiments, it is our intention that the invention not be limited by any of the details of the description, unless otherwise specified, but rather be construed broadly within its spirit and scope as set out in the accompanying claims.

What we claim is:

1. A water-swellable composition, comprising a water-swellable clay, an asphalt, and at least one material selected from the group consisting of temperature-sensitivity improving agents and reinforcing fillers, wherein said water-swellable composition is produced by mixing said clay, asphalt and material while heating to 100 to 200° C.

2. The water-swellable composition as claimed in claim 1, which comprises (a) 5 to 90% by weight of the water-swellable clay, (b) 5 to 90% by weight of the asphalt, and (c) 0.1 to 50% by weight of the at least one selected from the group consisting of temperature-sensitivity improving agents and reinforcing fillers.

3. The water-swellable composition as claimed in claim 1, which comprises (a) 30 to 70% by weight of the water-swellable clay, (b) 20 to 65% by weight of the asphalt, and (c) 0.5 to 40% by weight of the at least one selected from the group consisting of temperature-sensitivity improving agents and reinforcing fillers.

4. The water-swellable composition as claimed in claim 1, wherein the water-swellable clay is a smectite-series clay or a swellable mica.

5. The water-swellable composition as claimed in claim 1, wherein the water-swellable clay is a bentonite.

6. The water-swellable composition as claimed in claim 1, wherein the temperature-sensitivity improving agent is a rubber and the reinforcing filler is a zeolite.

7. The water-swellable composition as claimed in claim 1, further comprising an oil.

8. The water-swellable composition of claim 7, wherein the oil is present in an amount of 0.1 to 50% by weight.

9. The water-swellable composition of claim 1, which does not contain water.

10. The water-swellable composition of claim 1, wherein said mixing occurs until the mixture is uniform.

11. A water-swellable water-preventing sealant, comprising a water-swellable clay, an asphalt, and at least one material selected from the group consisting of temperature-sensitivity improving agents and reinforcing fillers wherein said water-preventing sealant is produced by mixing said clay, asphalt and material while heating to 100 to 200° C.

12. The water-swellable water-preventing sealant as claimed in claim 11, which comprises (a) 5 to 90% by weight of the water-swellable clay, (b) 5 to 90% by weight of the asphalt, and (c) 0.1 to 50% by weight of the at least one selected from the group consisting of temperature-sensitivity improving agents and reinforcing fillers.

13. The water-swellable water-preventing sealant as claimed in claim 11, which comprises (a) 30 to 70% by weight of the water-swellable clay, (b) 20 to 65% by weight of the asphalt, and (c) 0.5 to 40% by weight of the at least one selected from the group consisting of temperature-sensitivity improving agents and reinforcing fillers.

14. The water-swellable water-preventing sealant as claimed in claim 11, wherein the water-swellable clay is a smectite-series clay or a swellable mica.

15. The water-swellable water-preventing sealant as claimed in claim 11, wherein the water-swellable clay is a bentonite.

16. The water-swellable water-preventing sealant as claimed in claim 11, wherein the temperature-sensitivity improving agent is a rubber and the reinforcing filler is a zeolite.

17. The water-preventing sealant as claimed in claim 11, further comprising an oil.

18. The water-preventing sealant of claim 17, wherein the oil is present in an amount of 0.1 to 50% by weight.

19. A water-swellable composition consisting essentially of a water-swellable clay, an asphalt, and at least one material selected from the group consisting of temperature-sensitivity improving agents and reinforcing fillers.

20. A water-swellable water-preventing sealant, consisting essentially of a water-swellable clay, an asphalt, and at least one material selected from the group consisting of temperature-sensitivity improving agents and reinforcing fillers.

21. A process for producing a water-swellable composition which comprises mixing a water-swellable clay, an asphalt, and at least one material selected from the group consisting of temperature sensitivity improving agents and reinforcing fillers, at a temperature of 100 to 200° C.

22. A process for producing a water-swellable water preventing sealant which comprises mixing a water-swellable clay, an asphalt, and at least one material selected from the group consisting of temperature sensitivity improving agents and reinforcing fillers at a temperature of 100 to 200° C.

* * * * *